United States Patent Office 2,981,288
Patented Apr. 25, 1961

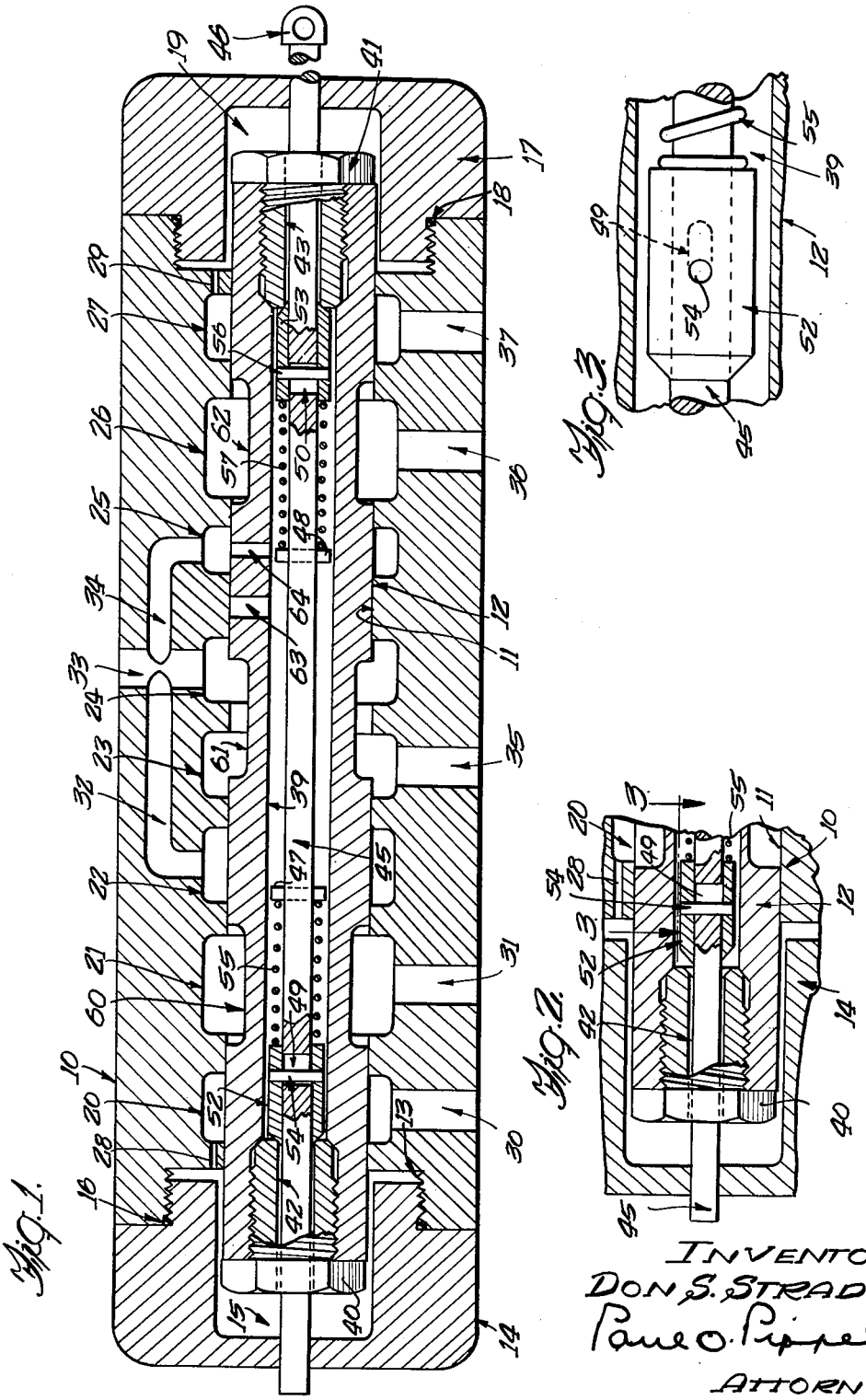

2,981,288

HYDRAULIC CONTROL VALVES

Don S. Strader, Mount Prospect, Ill., assignor to The Frank G. Hough Co., a corporation of Illinois Filed July 15, 1959, Ser. No. 827,215

4 Claims. (Cl. 137—622)

This invention relates generally to hydraulic fluid valves, and more particularly to an improved hydraulic fluid valve having certain mechanical servo mechanism means providing for operation of the valve under conditions of relatively high hydraulic fluid pressures.

In the use of manually operated hydraulic control valves under conditions of relatively high hydraulic fluid pressures and large flows and the tight fits required between the spools and bodies a relatively large and inconvenient manual pressure is required to move the valve. The present invention is directed to means for overcoming the problem of excessive manual force for operating a hydraulic valve by providing a certain mechanical servo mechanism for a valve construction which permits operation of the valve under conditions of relatively high hydraulic fluid pressures and flow with relatively small manual forces required to operate the valve.

It is another object of the present invention to provide a reciprocating type hydraulic fluid valve with servo mechanism means which is manually operable to in turn operate the valve.

It is a further object of the present invention to provide a hydraulic fluid valve construction wherein a source of hydraulic fluid under relatively high pressure may be conected thereto, and having a pair of ports which may be alternatively connected to the source of hydraulic fluid under pressure by the reciprocating motion of a valve spool slidably carried in the valve body and with a manually operable servo mechanism formed as an integral part of the valve spool for causing selected reciprocating movements of the valve spool.

Other objects and features of the present invention will be apparent upon a perusal of the following specification and drawing of which:

Figure 1 is a cross sectional view of a valve constructed according to the present invention;

Figure 2 is an enlarged partial view of the structure shown in Figure 1; and

Figure 3 is a partial view of the structure shown in Figure 2 and taken along the line 3—3 of Figure 2.

The present embodiment is the preferred embodiment but it is to be understood that changes can be made in the present embodiment by one skilled in the art without departing from the spirit and scope of the present invention.

For a general description of the present invention reference is made to the drawing. The valve of the present invention comprises a valve body or housing having a valve bore formed therein with a valve spool slidably carried therein for reciprocating movement between the closed ends of the valve bore. The valve spool has various annular groves and passageways formed thereon and therein which cooperate with a plurality of annular grooves in the valve bore, with the various grooves so relatively disposed that a hydraulic circuit for a controlled device may be connected thereto in addition to a source of hydraulic fluid pressure and a return or reservoir circuit, and so that connection of the source of hydraulic fluid and the reservoir to either of the controlled device ports occurs responsive to selected movements of the valve spool. The valve spool is formed to have a valve chamber and passageways extending axially therethrough and a control rod is mounted therein for reciprocating movement. The control rod has a pair of valve heads carried thereon which cooperate with certain valve seat means disposed between the valve chamber and pasageways in the valve spool, and the arrangement operates in such a manner that by a relatively light manual force applied to the rod, certain operations of the valve heads occur to provide for the admission of the high pressure hydraulic fluid to the ends of the valve spool to cause its desired operation. The force used to move the valve spool is produced by the hydraulic fluid high pressure source which by certain means is admitted to the valve chamber in the valve spool and therefrom is admitted by one or other of the valve heads to the appropriate end of the spool. Of particular advantage in the present invention is the construction which provides that when the control rod is stopped at any position of operation intermediate the extremes, the spool will also be stopped at the corresponding position. The valve will remain operated to that pos.tion without any necessity for any holding force on the control rod and the valve will not again be operated until the control rod is again moved to another position.

Turning next to a detailed description of the present invention, continued reference is made to the drawing. The valve body or housing 10 is provided with a cylindrical bore 11 formed longitudinally therethrough. A cylindrical valve spool 12 is slidably disposed within the valve bore 11. One end of the valve bore 11 is provided with a tapped hole 13 of a diameter greater than the diameter of the valve bore 11. The tapped opening 13 cooperates with the threaded portion of a cap 14 to seal that end of the valve bore 11. The cap 14 is provided with a cylindrical depression therein forming an extension of the valve bore 11. The depression has a diameter slightly larger than the diameter of the valve spool 12, and with the end of the valve spool which extends therewithin defines a chamber 15. The O-ring 16 pos.tioned between the cap 14 and the valve body 10 prevents leakage of hydraulic fluid from the valve bore 11. The other end of the valve is identical in construction, the valve body 10 having a threaded depression, and the cap 17 being threaded thereon with O-ring 18 providing hydraulic fluid sealing. The valve spool extends within the depression of the cap 17 and therewith defines the chamber 19.

The valve bore 11 is provided with annular grooves 20, 21, 22, 23, 24, 25, 26 and 27 positioned in a certain spaced apart relationship to each other along the length of the valve bore 11. Valve chamber 15 is connected with valve bore 20 for restricted fluid communication therebetween by passageway 28 which extends between the annular groove 20 and the increased diameter portion of the cap 14 extending over the end of the valve spool 12. The annular groove 27 at the other end of the valve bore 11 is connected to chamber 19 for restricted fluid communication therebetween by the passageway 29 which extends between annular groove 27 and the increased diameter portion of the cap 17 about the end of the spool 12. Annular groove 20 is also connected to a port 30. Annular groove 21 is connected to port 31. Annular groove 22 is connected to one end of a passageway 32 which at its other end is connected to port 33. Port 33 is also connected to annular groove 24 and to annular groove 25 through passageway 34. Annular groove 23 is connected to port 35 and annular grooves 26 and 27 are respectively connected to ports 36 and 37. The manner in which the valve is to be used in a hydraulic system will be described below.

The valve spool 12 is provided with a cylindrical chamber or passageway 39 extending longitudinally therethrough. Each end of the passageway 39 is formed of an increased diameter for a certain distance and is tapped for receiving bolts 40 and 41 therein. Each of the bolts 40 and 41, which are identical in construction, is respectively provided with holes 42 and 43 axially therethrough. The inner end of each hole 42 and 43 is flared outwardly to form a valve seat. The control rod 45 is carried through the valve, extending through cap 17, chamber 19, hole 43 of bolt 41, passageway 39, hole 42 of bolt 40, chamber 15 and cap 14. A clevis 46 secured on one end of the control rod 45 permits the attachment of suitable operating levers thereto. The control rod 45 has a diameter slightly less than the diameter of the holes 42 and 43 so that hydraulic fluid may relatively easily pass through holes 42 and 43 around control rod 45. Control rod 45 is provided with two pins 47 and 48 and two slots 49 and 50. The slots are positioned with their long axes longitudinally of the control rod 45. Two valve heads 52 and 53 are also provided. Valve head 52 is cylindrical in shape with an inner diameter substantially equal to the diameter of control rod 45 and with an outer diameter slightly less than the diameter of passageway 39. One end of the valve head 52 is tapered at an angle corresponding to the flared valve seat in bolt 40 and when positioned therein serves to seal hole 42 from a fluid communication with passageway 39. Valve head 52 carries a pin 54 which is secured transversely therethrough and through slot 49. Slot 49 must have a length greater than the diameter of pin 54. A compressed coil spring 55 is disposed between pin 47 carried by the control rod 45 and the inner end of valve head 52 and serves to bias the valve head 52 against the valve seat in the bolt 40. Valve head 53 is identical in construction to valve head 52, it also being provided with a tapered end which cooperates with the valve seat in bolt 41 to seal hole 43 from fluid communication with passageway 39. Valve head 53 carries a pin 56 which is secured therein and extends through slot 50. Slot 50 must have a length greater than the diameter of pin 56. A compressed coiled spring 57 is positioned between pin 48 and the inner end of valve head 53 and serves to bias the valve head 53 against the valve seat in bolt 41. When no force is exerted on the control rod 45, the coiled springs 55 and 57 will operate to respectively seat valve heads 52 and 53, and with the compressive forces in the springs 55 and 57 being approximately equal to each other, the control rod 45 will be positioned in a neutral balanced position wherein neither of the pins 54 and 56 will engage the end walls of the slots 49 and 50. In the neutral position the outward ends walls of the slots 49 and 50 are positioned substantially nearer to the pins 54 and 56 than are the inner end walls of the slots 49 and 50. Thus it may be seen that if the control rod 45 at the clevis 46 is moved inwardly of the valve body 10, and assuming a greater force is necessary to move the valve spool 12 than to unseat the valve heads 52 and 53, the outwardly disposed end of slot 50 will engage pin 56 carried by valve head 53 and move valve head 53 from its valve seat in passageway 43 of bolt 41. As this operation occurs, the inward end of the slot 49 will move toward pin 54. On a movement of the control rod 45 in the opposite direction, the outward end of slot 49 will engage pin 54 of valve head 52 moving valve head 52 inwardly of passageway 39 and unseating it from its valve seat in passageway 42 of bolt 40. Valve head 53 will not be disturbed, at this time, being merely seated with a greater force by the further compression of coiled spring 57 as the slot 50 is moved relative to the pin 56.

The remaining construction details of the present invention relate to the valve spool 12 which further is provided with three annular grooves 60, 61 and 62 positioned in a certain spaced apart relationship to each other along the outer surface of the valve spool 12. The valve spool 12 is further provided with two passageways 63 and 64 each extending between the outer surface of the valve spool 12 and passageway 39. The passageways 63 and 64 are positioned in a spaced apart relationship to each other longitudinally of the valve spool 12 and between annular grooves 61 and 62. The various annular grooves and passageways of the valve bore 11 and the valve spool 12 are relatively positioned so that in the neutral or center position shown in Figure 1, annular groove 20 is blocked, annular grooves 21 and 60 are interconnected in free fluid communication, annular groove 22 is blocked, annular grooves 23, 61 and 24 are connected in free fluid communication, passageway 63 is blocked, passageway 64 and annular groove 25 are connected in free fluid communication, annular grooves 62 and 26 are connected in free fluid communication, and annular groove 27 is blocked by the valve spool 12. If the valve spool 12 is moved further into cap 17, annular groove 20 remains blocked by the valve spool 12, annular grooves 21 and 22 of the valve bore and annular groove 60 of the valve spool 12 are connected in free fluid communication, annular groove 23 of the valve bore 11 is blocked by valve spool 12, annular groove 24 of valve bore 11 and annular groove 61 of valve spool 12 are connected in free fluid communication, passageway 63 of valve spool 12 is interconnected with annular groove 25 of the valve bore 11 in free fluid communication, passageway 64 of the valve spool 12 is blocked by the valve bore 11, and annular grooves 26 and 27 of the valve bore 11 are connected in free fluid communication by annular groove 62 of the valve spool 12. If the valve spool 12 is moved inwardly of the cap 14 from the neutral position, annular grooves 20 and 21 of the valve bore 11 are interconnected in free fluid communication by annular groove 60 of valve spool 12, annular groove 22 of the valve bore 11 is blocked by the valve spool 12, annular groove 23 of the valve bore 11 and annular groove 61 of the valve spool 12 are interconnected in free fluid communication, annular groove 24 of the valve bore 11 and passageway 63 in the valve spool 12 are interconnected in free fluid communication, passageway 64 of the valve spool 12 is blocked by the valve bore 11, annular groove 25 of the valve bore 11 is blocked by the valve spool 12, annular groove 26 of the valve bore 11 and annular groove 62 of the valve spool 12 are interconnected in free fluid communication, and annular groove 27 of the valve bore 11 is blocked by the valve spool 12.

For operation of the valve of the present invention, it is intended that port 33 be connected to a source of hydraulic fluid under pressure, that ports 30, 35 and 37 be connected to a suitable hydraulic fluid reservoir, and that ports 31 and 36 be connected to the hydraulic ram or motor the operation of which is to be controlled by the present invention. It is of course obvious that when either port 31 or 36 is supplying hydraulic fluid under pressure to the controlled device connected thereto, the other one of those ports may be connected to the reservoir.

In describing the operation of the present invention, it will be first assumed that the valve is connected as indicated above, and that the control rod 45 is in the neutral position shown in Figure 1, in which position both of the valve heads 52 and 53 will be seated against their valve seats to prevent the flow of any hydraulic fluid into chambers 15 or 19. Hydraulic fluid under pressure will be connected to passageway 39 in the valve spool 12 through the following circuit: port 33, passageway 34, annular groove 25, and passageway 64 to passageway 39. The flow of hydraulic fluid from the source will be over the following path: port 33, annular grooves 24, 61 and 23 to port 35 which is connected to the reservoir. The controlled device which is connected to ports 31 and 36 will be hydraulically locked in whatever position it may then be since annular grooves 21 and 26 are both sealed by the valve spool 12.

Assuming next that the control rod 45 is withdrawn from the valve or moved outwardly from the cap 17, the valve head 52 will be unseated such as shown in Figures 2 and 3. As the control rod 45 is moved outwardly, the end wall of the slot 49 will engage the pin 54 of the valve head 52 to move the valve head 52 from its valve seat in bolt 40. Valve head 53 will be biased more tightly against its valve seat by the further compression of coiled spring 57 by the pin 48 as the control rod 45 is moved. The hydraulic fluid under pressure in passageway 39 will then pass about control rod 45 through the passageway 42 in the bolt 40 to and into the chamber 15 in the cap 14. The hydraulic fluid under pressure in chamber 15 will then act against the end of the bolt 40 to move the valve spool 12 in the direction that the control rod 45 was moved. Any fluid in chamber 19 will be vented therefrom by a flow of hydraulic fluid around the end of the valve spool 12 and through the passageway 29, annular groove 27 and port 37 to the reservoir. Although some of the hydraulic fluid under pressure in chamber 15 will flow about valve spool 12 and through passageway 28, annular groove 20 and port 30 to the reservoir, because of the orifice created by the relatively small diameter of passageway 28, sufficient hydraulic fluid pressure will be retained in chamber 15 to move the valve spool 12. As the valve spool 12 is moved, the valve seat in the bolt 40 approaches the valve head 52, and when the control rod 45 is stopped, the valve seat therefor will engage the valve head 52 cutting off the flow of hydraulic fluid under pressure into chamber 15. The pressure of the hydraulic fluid in chamber 15 will then drop substantially to zero by a flow of hydraulic fluid therefrom through passageway 28 to the reservoir as previously noted, and the valve spool 12 will remain at the position to which it has been moved without any further movement or holding force on the control rod 45. Assuming that the valve spool 12 has been moved toward cap 17 sufficiently to interconnect the various grooves and passageways as described above, the hydraulic fluid under pressure will then flow from port 33, through passageway 32, annular grooves 22, 60 and 21, to port 31. As the spool 12 is moved toward cap 17, the annular groove 23 is blocked so that high pressure hydraulic fluid from port 33 no longer is connected to the reservoir, and the supply of high pressure hydraulic fluid to passageway 39 in valve spool 12 is continued by the interconnection of passageway 63 with annular groove 25. Port 36 is connected to port 37 through annular grooves 26, 62 and 27.

If the control rod 45 is moved in the opposite direction, in other words toward cap 14, the slot 50 in control rod 45 will engage pin 56 of valve head 53 removing it from its valve seat and permitting hydraulic fluid under pressure to flow through hole 43 in bolt 41 to valve chamber 19. Valve head 52 is, of course, not unseated by this movement of the control rod 45 as this movement causes a further compression of the coiled spring 55 by the pin 47. The hydraulic fluid under pressure in valve chamber 19 will cause the valve spool 12 to be moved toward cap 14, and any hydraulic fluid in valve chamber 13 will be vented therefrom through passageway 28 and annular groove 22 to port 30. With no further movement of the control rod 45, the valve spool 12 will be moved until the valve seat in bolt 41 engages valve head 53 to again close off the flow of any hydraulic fluid through hole 43 in bolt 41. When this occurs, the valve spool 12 will stop in that position and no further force need be applied to control rod 45 to maintain the operated position of valve spool 12. Assuming the extreme operated position in this direction of the valve spool 12 as previously described, the flow of high pressure hydraulic fluid from port 33 to port 35 will be blocked by valve spool 12, and high pressure hydraulic fluid will continue to be supplied to passageway 39 in valve spool 12 by the interconnection of annular groove 24 and passageway 63. High pressure hydraulic fluid will also be supplied to port 36 through passageway 34, and annular grooves 25, 62 and 26. Port 31 is connected to port 30 through annular grooves 20, 21 and 60.

In some constructions of the present invention it may occasionally occur in an extreme movement of spool 12 into cap 17, that passageway 64 will be connected to annular groove 26 which at that time is connected to the reservoir. For that reason, passageway 63 is formed with a diameter substantially larger than passageway 64, thereby providing for sufficient fluid pressure in passageway 39 to insure proper operation of the valve.

From the foregoing it may be seen that the present invention provides a hydraulic valve with a servo mechanism such that the spool of the valve is moved by hydraulic fluid pressures controlled by a control rod requiring a relatively small moving force, with the servo mechanism neutralizing itself after any operation to obviate the need for any further force on the control rod. Although the valve of the present invention is described as open-centered in that the hydraulic fluid under pressure flows direct to the reservoir when the valve is in the neutral position, the present invention may be equally well applied to a closed-center valve and, of course, may easily be applied to valves having other porting arrangements. It should also be noted that the valve may be constructed for two-way or three-way operation as well as the four-way construction shown herein. Operation of the control rod by means other than manual is also apparent.

Having described the invention what is considered new and desired to be protected by Letters Patent is:

1. In a hydraulic fluid valve having a valve body, a valve bore formed in said valve body, a valve spool slidably carried in said valve bore, each end of said valve bore being formed to define a chamber with the cooperating end of said valve spool, a servo valve chamber formed in said valve spool longitudinally thereof and being connected into said chambers at each end of said valve bore, a valve seat formed in said servo valve chamber at each end thereof, a control rod slidably carried in said hydraulic fluid valve and positioned to extend through said valve body, said valve bore, and said servo valve chamber of said valve spool, a pair of valve heads, each of said valve heads positioned on said control rod in said servo valve chamber and each being formed to seat on one of said valve seats to prevent any hydraulic fluid flow from said servo valve chamber to the ends of said valve bore, means operatively connecting said valve heads to said control rod so that when said control rod is moved toward one end of said servo valve chamber, the valve head at that one end remains seated while the valve head at the other end thereof is moved from the cooperating valve seat thereof and movement of said control toward the other end of said servo valve chamber will move the valve head at said one end of said servo valve chamber from the cooperating valve seat while the valve head at said other end remains seated.

2. In a hydraulic fluid valve having a valve body with a valve spool slidably carried in the valve bore thereof, a servo mechanism formed in said valve spool for providing for operation of the valve by a relatively light force comprising, a valve chamber formed in said valve spool longitudinally thereof and being connected at each end thereof to said valve bore through a passageway having an annular valve seat formed therein, a control rod extending through said valve and said valve chamber in said valve spool, a pair of cylindrical valve heads, each of said valve heads positioned on said control rod and having an inner diameter substantially equal to the diameter of said control rod, a pair of slots formed in said control rod with the major axis of each thereof positioned longitudinally of said control rod, each of said slots further positioned within one of said cylindrical valve heads, a pin carried by each of said valve heads and positioned to extend transversely therethrough and through one of said slots in said control rod, each of said pins positioned longitudinally of said valve heads so that when each valve head is seated on the cooperating valve seat thereof, each pin is disposed substantially adjacent to the outwardmost end of said slots, a pair of coiled springs, each of said coiled springs positioned in said servo valve chamber and carried on said control rod to bias one of said valve heads on the cooperating valve seat, so that when said control rod is moved in one direction, one of said valve heads is moved from the cooperating valve seat thereof while the other of said valve heads remains seated and so that when said control rod is moved in the other direction, the other of said valve heads is moved from its valve seat while said one of said valve heads remains seated.

3. In a hydraulic fluid valve having a valve body, a valve bore formed in said valve body, a plurality of valve ports formed through said valve body into said valve bore for admitting high pressure hydraulic fluid to said valve bore, for venting hydraulic fluid from said valve bore and for directing hydraulic fluid through two valve ports to any controlled device, a valve spool slidably carried in said valve bore and being formed to slidably connect said high pressure fluid port and said venting ports to said two ports for connection to a controlled device, said valve bore being closed at each end thereof to define chambers with each end of the valve spool, an orifice connected between each chamber at the ends of said valve spool and said venting ports to provide for a metered flow of a relatively small volume of any fluid from said chambers, a valve chamber formed in said valve spool, a passageway formed through each end of said valve spool into said valve chamber in said valve spool, a valve seat in each of said passageways, a control rod extending through said valve body, said passageways of said valve spool and said valve chamber in said valve spool, a valve head positioned about said control rod at each end of said valve chamber in said valve spool for cooperation with one of the valve seats in each of said passageways, each of said valve heads and said control rod being formed so that the valve head at the end of said valve chamber in said valve spool opposite that toward which said control rod is moved from said valve seat to permit any hydraulic fluid under pressure in said valve chamber in said valve spool to flow through the associated passageway when said control rod is moved in either direction at a volume substantially greater than that of said relatively small volume of flow through said orifices, and fluid passageway means formed through said valve spool into said valve chamber in said valve spool and cooperating with said high pressure fluid port for admitting any high pressure hydraulic fluid from said high pressure hydraulic fluid port to said valve chamber in said valve spool in all operated positions of said valve spool.

4. In a hydraulic fluid valve having a valve body, a valve bore formed in said valve body, a plurality of valve ports formed through said valve body into said valve bore for admitting high pressure hydraulic fluid to said valve bore, for venting hydraulic fluid from said valve bore and for directing hydraulic fluid through two of said valve ports to any controlled device, a valve spool slidably carried in said valve bore and being formed to slidably connect said high pressure fluid port and said venting ports to said two ports for connection to a controlled device, said valve bore being closed at each end thereof to define chambers with each end of the valve spool, an orifice connected between each chamber at the end of said valve spool and said venting ports to provide for a metered flow of a relatively small volume of any fluid from said chambers, a valve chamber formed in said valve spool, a passageway formed through each end of said valve spool into said valve chamber in said valve spool, a valve seat in each of said passageways, a control rod extending through said valve body, said passageways of said valve spool and said valve chamber in said valve spool, a valve head positioned about said control rod at each end of said valve chamber in said valve spool for cooperation with one of the valve seats in each of said passageways, means carried by each of said valve heads and formed in said control rod so that when said control rod is moved in either direction, the valve head in the direction of movement of the control rod remains seated on the cooperating valve seat thereof while the other valve head is moved from the cooperating valve seat thereof to permit any hydraulic fluid under pressure in said valve chamber in said valve spool to flow through the passageway associated with the unseated valve head at a volume substantially greater than that of said relatively small volume of fluid flow through said orifices, fluid passageway means formed through said valve spool into said valve chamber in said valve spool and cooperating with said high pressure fluid port for admitting high pressure hydraulic fluid from said high pressure hydraulic fluid port to said valve chamber in said valve spool in all operated positions of said valve spool, the area at each end of said valve spool being substantially larger than the areas of said valve heads in said valve chamber in said valve spool which are subject to seating forces by any hydraulic fluid under pressure in said valve chamber in said valve spool.

References Cited in the file of this patent
UNITED STATES PATENTS

| | | |
|---|---|---|
| 2,526,709 | Tait | Oct. 24, 1950 |
| 2,579,028 | Baldwin | Dec. 18, 1951 |
| 2,599,899 | Denton | June 10, 1952 |
| 2,663,143 | Joy | Dec. 22, 1953 |